W. M. HANEY.
MOTOR VEHICLE STEERING DEVICE.
APPLICATION FILED MAR. 6, 1915.
1,172,356.
Patented Feb. 22, 1916.
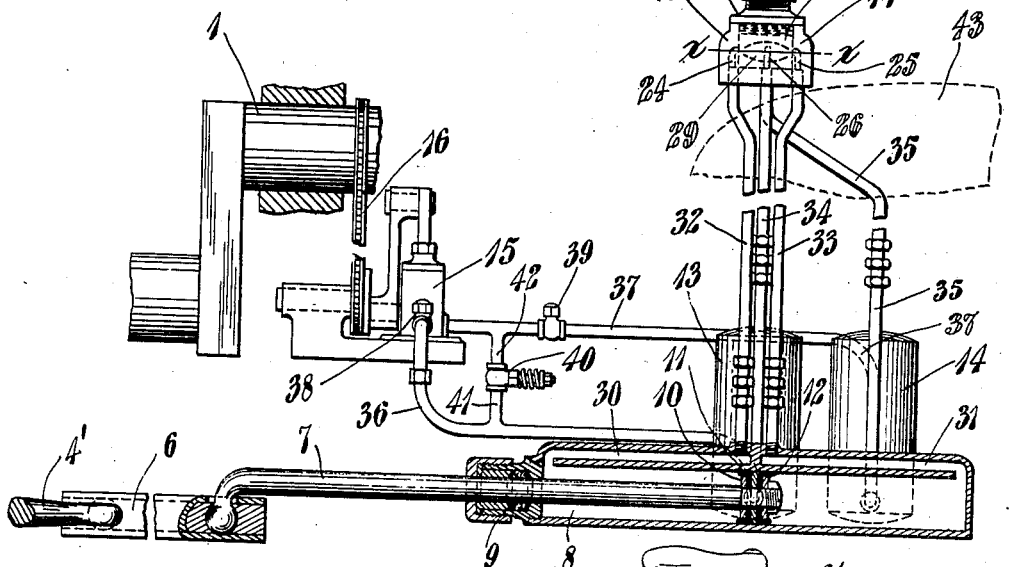
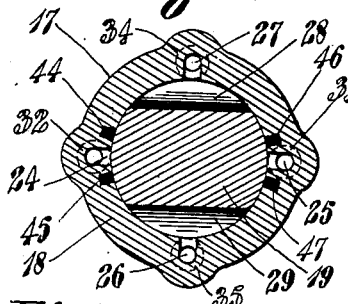
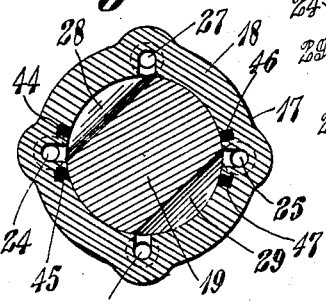
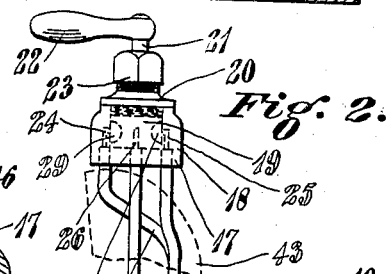
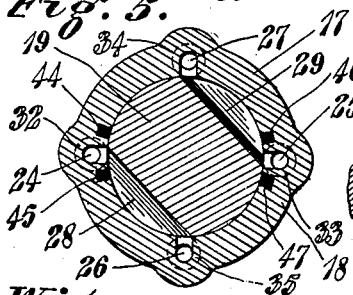
Witnesses:
Clarence Verden
Catherine Doran
Inventor
William M. Haney
By James N. Ramsey
Attorney

UNITED STATES PATENT OFFICE.

WILLIAM M. HANEY, OF ELMWOOD PLACE, OHIO.

MOTOR-VEHICLE STEERING DEVICE.

1,172,356. Specification of Letters Patent. Patented Feb. 22, 1916.

Application filed March 6, 1915. Serial No. 12,686.

*To all whom it may concern:*

Be it known that I, WILLIAM M. HANEY, a citizen of the United States, and a resident of Elmwood Place, in the county of Hamilton and State of Ohio, have invented certain new and useful Improvements in Motor-Vehicle Steering Devices, of which the following is a specification.

My invention relates to steering; and its object is to reduce the effort required to steer conveyances, especially self propelled vehicles.

My invention consists in the combination of parts and in the details of construction and arrangement of parts as will herein be more fully described and claimed.

In the drawing: Figure 1 is a side elevation of apparatus embodying my invention, parts thereof being broken away for lack of space; Fig. 2 is a rear elevation of the same; Fig. 3 is a horizontal cross section on the line $x$—$x$ of Fig. 1 through the controlling valve, showing the position of the valve when steering straight ahead; Fig. 4 is a similar view showing the position of the valve when steering to the right; and Fig. 5 is a similar view showing the position of the valve when steering to the left.

My invention involves the application of power to the steering mechanism from the motive apparatus or other moving part thereof. The motive apparatus is represented herein by part of a crank shaft 1 which may be the crank shaft of an engine such as is usually found on motor vehicles or other self propelled conveyances, and the steering mechanism of a motor vehicle is represented by the knuckle 2 of the forward axle, carrying the spindle or skein 3 of one of the forward wheels, and having the arm 4, articulately connected to which is the cross rod 5, running across to the other knuckle which carries the other front wheel. Also articulately connected to the other arm 4' is the connecting bar 6 which runs back and is usually connected to an arm or similar element making up part of a hand-operated steering mechanism. In my invention however, this connecting bar 6 is articulately connected to a plunger rod 7, which enters a cylinder 8 through a suitable stuffing box 9 and is fixed to a plunger 10, fitting in the interior of the cylinder. Suitable packings 11 and 12 on the plunger, against the walls of the cylinder, are presented in opposite directions therealong. Thus, the application of fluid pressure in one end or the other of the cylinder 8 will cause the plunger 10 and rod 7 to move one way or the other, and, through the connecting bar 6, move the arm 4 of the knuckle 2, and consequently the wheels of the vehicle, one way or the other; or if the pressure be maintained equal on both sides of the plunger 10, the plunger and these parts that are connected thereto will be held in any position that they happen to be in when this pressure is thus equalized.

It is highly necessary that the wheels of a vehicle by which it is steered be positively held in any position which it is desired they may have, whether for running straight ahead or for turning to the right or left, and I therefore prefer to employ a liquid for transmitting the pressure to the interior of the cylinder 8 and for maintaining this pressure therein, since liquid is incompressible and therefore equivalent to a solid element, while at the same time being fluid and therefore adapted to be manipulated with great facility. The elastic mediums of power transmission, such as aeroform fluids, are objectionable in this respect; and I therefore exclude that air or other gaseous fluid from the cylinder and use liquid exclusively, to positively hold the plunger and the connected parts against movement in either direction. Also, all the liquid-containing parts adjacent to the plunger are made rigid, avoiding use of any electric medium whatever in this part of the device.

The liquid under pressure is obtained from a pressure tank 13, while the exhausted liquid passes to a receiving tank 14. The pressure is applied to the liquid by a suitable pump 15 operated through the medium of a belt or chain 16 passing around the crank shaft 1; and the entrance of this liquid under pressure from the pressure tank 13 to one end or the other of the cylinder 8 is controlled by a suitable controlling valve 17. This controlling valve 17, as here shown, comprises a valve casing 18 with a cylindrical interior on an upright axis and open at the top to admit a cylindrical plug 19, down over which is secured a cover 20, the plug having a stem 21 and handle 22, and the cover 20 being provided with a suitable stuffing box 23 around the stem where it extends up therethrough.

The casing 18 has in its sides, preferably at intervals of 90° therearound as shown, upright ports 24, 25, 26 and 27, while about midway of the height of the cylindrical plug 19 this plug has, formed in its convex sides, passages 28 and 29, each of these passages preferably being, as shown, of substantially semi-circular cross section at its middle and decreasing in width and depth toward both ends, as a consequence of the forming of such a groove in the slide of the cylindrical plug.

The cylinder 8 has ports 30 and 31 separated by a wall 32 at the middle of the cylinder and each leading along the top of the cylinder to a respective end thereof and there opening into the interior of the cylinder. A right hand rigid connecting pipe 32 leads from the valve port 24 into the cylinder port 30, and a left hand rigid connecting pipe 33 leads from the valve port 25 opposite the valve port 24 into the cylinder port 31. A pressure pipe 34 leads from the pressure tank 13, preferably near the bottom thereof, to the valve port 27 and an exhaust pipe 35 leads from the opposite valve port 26 to the receiving tank 14, preferably entering near the bottom thereof.

The supply pipe 36 leads from the pump 15 to the pressure tank 13, preferably entering near the bottom thereof, and the return pipe 37 leads from the receiving tank 14, preferably near the bottom thereof, to the pump 15. Check valves 38 and 39 are provided in the supply pipe 36 and return pipe 37, respectively, to coact with the pump, which as here shown, is a reciprocating single acting pump of very simple construction and relatively small but powerful. It will be understood that any suitable pump or pressure creating means may be utilized, the object being to maintain as nearly as possible a continuous body of liquid throughout the supply pipe 36, pressure tank 13, the pressure pipe 34 and, as the case may be, either the connecting pipe 32 and forward end of the cylinder 8 or the connecting pipe 33 and the rear end of said cylinder, designating these according to the positions in which they are shown in this example. It will be understood that the relative arrangement of the parts may be varied to adapt the device to various vehicles upon which it is installed. It is also desirable to have this body of liquid continuous throughout the exhaust pipe 35, receiving tank 14 and return pipe 37. A by-pass valve 40 is interposed between pipes 41 and 42, connecting with the supply pipe 36 and return pipe 37, so that, at all times, except when moving the plunger 10, the pump 15 will be maintaining a circulation of the fluid or liquid in a closed circuit, which circulation of the liquid may be diverted by the controlling valve 17 to apply the impelling action of the pump to one side or the other of the plunger 10 in the cylinder 8. This by-pass valve 40 is so adjusted that it will not open except under greater pressure than that required to move the steering means under the most severe conditions, so that when the pressure is relieved in either end of the cylinder the by-pass valve 40 will remain closed and afford the reaction necessary for the impelled liquid to move the plunger in the cylinder toward the end having the reduced pressure, as hereinbefore described. Any suitable pump comprising a by-pass in its construction may be substituted for this arrangement.

The liquid used is preferably an oil adapted to maintain its fluidity at the lowest temperature to which it is exposed under varying weather conditions. It is also desirable that the oil be not highly evaporative. Such evaporation as occurs may be compensated for by supplying additional liquid occasionally. This may be done by opening the controlling valve 17, removing the plug 19 therefrom and pouring the liquid into the tanks 13 and 14 through the pressure pipe 34 and exhaust pipe 35, or a separate inlet may be provided.

The controlling valve 17 may be located at the side of the driver's seat 43, either at the right or left according to the traffic regulations, so that it is extremely conveniently operated and is also readily accessible for renewing the supply of liquid as above described. The cylinder 8 is located substantially on the level of the front axle and knuckle 2 and arm 4; and the plunger rod 7 may be turned to any position to make the hereinbefore described articulate connection with connecting bars such as the bar 6 before alluded to, or any of the other styles of steering connections that the conveyances may have. The pressure tank 13 and receiving tank 14 may be of any suitable size and placed at any desired elevation to secure the coöperation of gravity with the pump 15, especially in the return of the liquid from the receiving tank 14 through the return pipe 37. This return is effected by gravity, so that there is no need of any exposed surface of liquid either in the receiving tank 14 or the exhaust pipe 35, nor of any air pressure thereon, so that the continuous body of liquid in these low pressure spaces is permissible; and also air or other gaseous substance may be excluded, so that there is no defect due to the trapping of any air or other gas in the liquid to be carried into the pressure parts of the device and thus permit of some lost motion due to the compressibility of the air or gas. Also, by maintaining the body of liquid continuous throughout the parts, to the exclusion of air or other gas, the evaporation of the liquid will be minimized.

The walls of the valve casing 18 are provided with packings 44 and 45 flanking the port 24 and packings 46 and 47 flanking the port 25. I prefer to locate these packings in the casing walls rather than in the plug 19 with the passages 28 and 29 formed as shown and above described, because the edges of these passages impose less destructive impact on the packings than would the edges of the valve ports with the packings in the plug.

Constructed as above described, the valve plug is rotated to the position shown in Fig. 3 for steering the vehicle straight ahead. In this position it will close both connecting pipes 32 and 33 to the cylinder ports 30 and 31 and the liquid will be held in two distinct bodies in the connecting pipes 32 and 33 and cylinder ports 30 and 31 and the respective ends of the cylinder, holding the plunger 10 at the middle of the cylinder in the position shown in Fig. 1. Consequently through the connecting parts 7, 6, 5, 4, 2 and 3 the wheels of the vehicle will be held rigidly in position for running straight ahead. Since the respective bodies of liquid are incompressible, no movement of the parts will be permitted. At the same time, communication will be cut off between the ports 26 and 27, although these ports do communicate with the separate passages 28 and 29 in the plug, and therefore there will be no escape of liquid from the pressure tank 13.

To turn to the right, the plug 19 is turned as shown in Fig. 4. This connects the port 25 with the port 26, so that liquid may flow from the rear end of the cylinder 8 through the connecting pipe 32, port 25, passage 28, port 26 and exhaust pipe 35 into the receiving tank 14. At the same time, the port 24 is connected with the port 27, so that liquid may flow from the pressure tank 13 through the pressure pipe 34, port 27, passage 29, port 24, and connecting pipe 33 and cylinder port 30 into the forward end of the cylinder 8. Since the receiving tank 14 connects with the suction side of the pump 15, and the pressure tank 13 connects with the discharge or pressure side of the pump, there will therefore be a pressure acting upon the plunger 10 and connected parts moving them backward and turning the wheels to the right. This position of the valve is maintained as long as required to move the wheels to the desired position; that is, to impart the required direction of turning to the vehicle. Then, to maintain this direction, the plug must be turned back far enough to cut off the communication between the ports 27 and 24, which as will be seen, is only such amount of turning as to bring the end of the passage 28 past the adjacent packing 44 which will also bring the other passage 29 past the adjacent packing 47 at the other side of the valve. Then the condition of Fig. 3 will be renewed, and the position will be maintained by the incompressibility of the bodies of liquid thus cut off in the two ends of the cylinder and the respective connecting pipes, although the relative volumes of the two bodies will now be changed, since the plunger 10 has been moved backward in the cylinder.

To return the wheels to the position for running straight ahead, the valve plug 19 will be turned to the position shown in Fig. 5 long enough to effect this movement; and this position shown in Fig. 5 is also the one for bringing the wheels into position for turning to the left. In this position, the port 24 is connected through the passage 28 with the port 26 thus connecting the forward end of the cylinder through the connecting pipe 33, port 24, passage 28, port 26 and exhaust pipe 35 with the receiving tank 14; while the port 25 is connected through the passage 29 with the port 27, thus connecting the pressure tank 13 through the pressure pipe 34, port 27, passage 29, port 25, connecting pipe 32 and cylinder port 31, with the rear end of the cylinder 8, so that pressure is applied to move the piston 10 forward in the cylinder, and, through the connecting parts, turn the wheels to the left. This position of the plug is maintained until the desired position to the left is reached, after which this left hand position may be maintained by turning the plug back until the ends of the passages 28 and 29 pass the adjacent packings 45 and 46 in the same manner as above described for maintaining the right hand position; except that opposite ends of the passages and opposite packings are involved in this operation. The wheels will be brought back to position for running forward by bringing the plug around to the position shown in Fig. 4, just as the wheels were brought from the right to forward position by bringing the valve plug from the position shown in Fig. 4 to that shown in Fig. 5, as hereinbefore described.

It will be seen that a turn from straight ahead to either right or left position is accomplished by turning the plug 19 through one-eighth of a revolution, while a turn from this back to the straight ahead position or to the opposite turnout direction is accomplished by a one-quarter turn of the plug. The required operation of the controlling valve 17, therefore, to effect any change in direction of the vehicle is very slight. The passages through the pipes and the ports of the device may be of very small cross section, so that the hydraulic pressure against the plug 19 is very slight, and therefore the turning of the plug through these slight distances encounters very slight resistance. Under these circumstances the effort required of the driver in steering the vehicle is reduced to the simple turning of the hand, grasping the handle 22 of the controlling valve 17. This handle preferably is in toward the driver when the plug is set for steering straight ahead or for maintaining the wheels in any desired right or left position after bringing them to such position, but turned to the left to steer to the left or to return the wheels from a right hand position, and turned to the right to steer to the right or return the wheels from a left hand position. The required movements therefore are extremely simple and readily comprehended and remembered. It will be understood that the handle 22 may be directed in other directions depending upon the choice of the driver. Thus, a forward position of the handle may cause forward movement of the vehicle; or maintain any position, and right and left movements from the forward position would still cause right and left steering of the vehicle, or bringing of the wheels back from left or right positions, as above described.

It will be understood that any approved form of four-way valve or its equivalent may be used as a controlling valve, and that the construction of other details may be varied from that shown in the example herein; and while I have shown and described specifically this example, I do not wish to be understood as being limited to the precise details thereof, but

What I claim as new and desire to secure by Letters Patent is:

In combination with a motor vehicle, and steering means for said vehicle, liquid-pressure-operated means for operating the steering means, a pump comprising an inlet and an outlet and adapted to constantly apply pressure to a liquid, a controlling valve to apply a liquid under pressure to said liquid-pressure-operated means in either one of two directions, or to prevent the application of a liquid under said pressure to said liquid-pressure-operated means when said steering means is not to be operated in either direction, liquid-conducting means from said pump to said valve, liquid-conducting means from said valve to said liquid-pressure-operated means, liquid contained in and substantially continuous throughout said pump, said valve, said liquid-pressure-operated means, and the respective liquid-conducting means, substantially to the exclusion of gaseous mediums, and a by-pass from said outlet to said inlet for limiting rise of pressure of said liquid on said valve when said valve prevents the application of said liquid under said pressure to said fluid-pressure-operated means.

WILLIAM M. HANEY.

Witnesses:
JAMES N. RAMSEY,
CLARENCE PERDEW.